June 13, 1967  M. E. ST. CLAIR  3,324,503
APPARATUS FOR THE HUMANE SLAUGHTER OF SMALL ANIMALS
Filed May 24, 1965  10 Sheets-Sheet 1

June 13, 1967  M. E. ST. CLAIR  3,324,503
APPARATUS FOR THE HUMANE SLAUGHTER OF SMALL ANIMALS
Filed May 24, 1965  10 Sheets-Sheet 6

June 13, 1967     M. E. ST. CLAIR     3,324,503
APPARATUS FOR THE HUMANE SLAUGHTER OF SMALL ANIMALS
Filed May 24, 1965     10 Sheets-Sheet 9

FIG. 21.

June 13, 1967 M. E. ST. CLAIR 3,324,503
APPARATUS FOR THE HUMANE SLAUGHTER OF SMALL ANIMALS
Filed May 24, 1965 10 Sheets-Sheet 10

3,324,503
APPARATUS FOR THE HUMANE SLAUGHTER
OF SMALL ANIMALS
Melvin E. St. Clair, Greenwich, Conn., assignor to The
American Society for the Prevention of Cruelty to
Animals, New York, N.Y., a corporation of New York
Filed May 24, 1965, Ser. No. 458,308
1 Claim. (Cl. 17—1)

This invention relates to a means and apparatus for the more humane slaughter of small animals, particularly calves, sheep and lambs. Its object is to reduce or eliminate the pain and suffering to which such animals are frequently subjected both prior to and during the slaughtering operation, and particularly to eliminate the shackling and hoisting of conscious animals.

The method of slaughter almost universally in use throughout the United States at the present time comprises what is commonly known as "shackling and hoisting." A chain is fastened to, or around, one hind leg of the animal, which is then hoisted above the floor by that leg only, and while so hanging is moved along an assembly line until it is convenient for it to be slaughtered. If the animal is conscious when thus "hoisted," it becomes frightened, and usually threshes or jerks in an effort to escape, thus suffering considerable, and immeasurable, pain as well as frequent physical injury. Sometimes the struggling animal breaks a leg, breaks its back or suffers internal injuries and bleeding, and quite frequently bruises itself. Such bruises or injuries may go undetected until the meat is inspected, but when they are discovered, the meat may be rejected.

Heretofore, various methods and devices which it was hoped might eliminate some of the suffering and waste have been sought, or attempted to be introduced, by those interested in more humane treatment of animals. Such attempts have usually centered around what is known as "immobilizing," that is, rendering the animal unconscious prior to shackling and hoisting. The two methods most commonly used or attempted for such immobilizing have been gassing and stunning of the animal.

Immobilization of a food animal by rendering it unconscious prior to slaughter is forbidden by the Jewish ritual of shechita, or kosher slaughter. This requires that the animal be fully conscious at the moment of death. For such kosher slaughtering, therefore, shackling and hoisting of live and conscious animals has, until recently, been the only practical method of slaughtering food animals which is consistent both with the Jewish religious requirements and with United States Government sanitary regulations. The latter prohibits allowing animals to come into contact with the ground or floor of the slaughtering room during the slaughtering operation.

A number of devices have heretofore been proposed in an effort to solve this problem while simultaneously deferring to such religious views and complying with the governmental sanitary regulations. As yet, however, none have been put into commercial operation to any considerable extent. This has been because the prior attempts have failed to meet either the Jewish religious requirements for ritualistic slaughter or the governmental sanitary regulations, or both; because they have been too expensive to build or maintain and operate economically; or because they have been too cumbersome and slow for acceptable operation in a modern slaughterhouse.

Among the devices which have heretofore been successfully adopted for the slaughter of large animals such as beef cattle is the apparatus described and claimed in the Marshall et al. Patents Nos. 3,087,195 and 3,092,871, owned by the assignee of the present application. That apparatus has proven successful and humane in the case of larger animals and is now in operation in several slaughterhouses. In the case of smaller animals, however, it is desirable or essential to provide methods and means which are specifically adapted to the size and weight of the animals concerned, and to increase the speed with which such smaller animals may be slaughtered in a humane manner.

It is, therefore, an object of the present invention to provide a means and an apparatus whereby animals, and particularly small animals, such as calves, sheep and lambs, may be slaughtered in the most humane manner possible, that is, with the least possible pain, suffering, fright and injury to the animal. It is a further object of the invention to reduce the waste of meat resulting from injury during the slaughtering operation. A still further object of the invention is to accomplish the foregoing results in a manner which is feasible for satisfactory commercial operation in a modern slaughterhouse, and which is at the same time compatible both with Jewish religious requirements and with governmental sanitary regulations.

Apparatus embodying the present invention comprises in its preferred form a holding pen wheel assembly rotatable in a vertical plane about a horizontal axis and provided with a plurality of animal compartments, three in the embodiment illustrated, each parallel, in the longitudinal direction in which the animal is received, to the axis of rotation of the device and extending radially outward from that axis. Each compartment is constructed to receive a small animal, such as a calf, a sheep or a lamb, and to support and restrain such animal with its head and throat exposed and with its feet raised above the floor of the compartment. The holding pen wheel assembly is rotatable in such a manner that the animal may, preferably, be loaded into the uppermost compartment while that compartment is in an upright or vertical position and the animal thus enters while upright. After loading, the animal is clamped by the sides of its body in such a way as to restrain bodily movement and the wheel assembly is rotated to bring the loaded compartment to a second position, in which the animal is at least partially inverted, at the same time, however, being cradled, supported and protected from injury. The animal is thus placed in position for slaughter, and is then slaughtered by cutting its throat while it is in that position. The holding pen wheel assembly is further rotatable to a third position in which the compartment may be opened and the carcass of the slaughtered animal removed.

It is a feature of the invention that the foregoing steps of the method may be performed sequentially as regards each individual compartment while, simultaneously, the other steps are performed in adjoining compartments. Thus, in the embodiment illustrated, in which three compartments share between them the entire circumferential extent of the holding pen wheel assembly, one compartment is in the vertical or loading position (first or "a" position) while its adjoining compartment, in a clockwise direction (assuming that such is the desired direction of rotation) is in the slaughtering position (second or "b" position) spaced 120° spaced clockwise, and the third compartment is in the unloading position (third or "c" position), again spaced 120° in a clockwise direction. The operation may thus be a continuous one in the sense that while the upper compartment is being loaded (being, of course, stationary at the time), an animal is being slaughtered in the second compartment next (120°) to the right and the slaughtered animal is being unloaded from the third compartment, again 120° to the right.

The holding pen wheel assembly is never in a state of continuous rotation, but is, by suitable mechanism hereinafter described, rotated by steps of 120° each, and halted in the proper position for performance of the appropriate operations at each position or station. A feature of the invention is an operating and timing or safety device, later to be described in detail, not only for rotation of the assembly to its next appropriate position when the respective operations have been completed at each station, but to prevent accidental or premature rotation while any one of the three operations remains uncompleted. Particularly, means are provided to prevent access of an unslaughtered animal to the upright or receiving compartment unless that compartment is vacant and has come to a full stop.

Thus, in a preferred embodiment of the invention, the holding pen wheel assembly cannot be rotated until each of the three simultaneous operations, loading, slaughtering and unloading, has been completed at its appropriate station. Preferably, a signal indicating such completion must be given from each of the three stations before the wheel assembly can be rotated to its next position. A modification of this arrangement is, however, described in which a different operation of the signalling and safety controls is possible and the entire apparatus can be operated, and the method performed, by only two persons, normally a schochet and his assistant.

A still further feature of the invention is a chute and conveyor assembly, cooperating and coordinated with the holding pen wheel assembly, by which the living animals may, if desired, be presented, in line and one at a time, to the upright compartment of the wheel assembly. This chute and conveyor assembly is preferably provided, also, with a coordinated gate mechanism which prevents entry of more than one animal at a time into the compartment which is at that time in loading position and which bars access to the loading compartment when the wheel assembly is in rotation. Appropriate mechanism or mechanisms for operation and coordination of the holding pen wheel assembly, the chute and conveyor assembly and, preferably, also, of the gate mechanism, is hereinafter described.

Still another feature of the invention is a method whereby small animals may be slaughtered with a minimum of pain and injury to the animal, such method comprising principally the steps of first receiving an animal into an enclosure, preferably while the animal is in a vertical position and supported with its feet off the floor, and is held in place by gentle pressure from the side; then inverting, or partially inverting, the enclosure with the animal cradled inside; slaughtering the animal while in such inverted, or partially inverted, position; and moving the enclosure, with the animal carcass still inside, to yet another position and there removing the animal, but only after it has lost consciousness, from the enclosure. The several operations may be conducted simultaneously and repetitively at each of the several stations or positions, after completion of which operations the compartments are simultaneously rotated to the next position so that, except during actual rotation of the holding pen wheel assembly comprising the various compartments, an animal is always being loaded at one position, preferably the upright one, slaughtered at the next position and its carcass unloaded at a third position.

Moreover, according to the foregoing method, the operation of the holding pen wheel assembly may be combined and coordinated with that of the cooperating loading and access chute, and preferably, also, with the operation of a gate at the exit end of such chute, so that the animals are automatically, and successively, presented to the loading compartment, head on, one at a time, and without delay, an unslaughtered animal being always available for loading into the empty compartment when it comes to the top, but the gate preventing loading unless the loading compartment is empty and until it comes to a stop in the proper loading position, and, again preferably, with appropriate means for preventing rotation of the loading compartment until the animal has been properly loaded and secured against struggle or injury.

According to the preferred method, also, rotation of the holding pen wheel assembly containing the loaded animal is prevented until the operations at the other two stations have also been completed and such completion either observed by an operator at the loading station or signalled from one of the other stations, from which the loading station is visible.

In order to illustrate the nature of the present invention and its advantages, we shall first describe in detail the holding pen wheel assembly and its cooperating loading and access chute, together with the conveyor, if any, which is preferably, but not necessarily, contained in the chute. The holding pen wheel assembly, alone, and the chute, alone, in their respective individual parts, elements and methods of operation, as well as the holding pen and chute in combination for conjoint use and operation, embody parts or features of my invention and may be used according to certain steps or features of my method. They are illustrated in the accompanying drawings which include what is at present the preferred, and best known, form of my invention and in which:

The apparatus of our invention will first be described with reference to the embodiment shown in FIGS. 1 through 9 hereof.

The apparatus according to the present invention consists principally of two main portions, a rearwardly and downwardly inclined access and feeding chute, or conveyor section, indicated generally at 10, and a forward holding pen comprising a rotatable holding pen wheel assembly generally indicated at 11 and capable of being rotated in a vertical plane about the horizontal axis 30.

The chute 10, in this embodiment, comprises two sides 12, preferably of sheet metal or other opaque material, and supported on suitable frame members 13 and 14. The chute itself is preferably open at the top to admit light, since it is commonly believed that animals which are being moved are less susceptible to fright and confusion if they are able to see light ahead, with little contrasting dark or shaded areas.

Figures 1, 4:
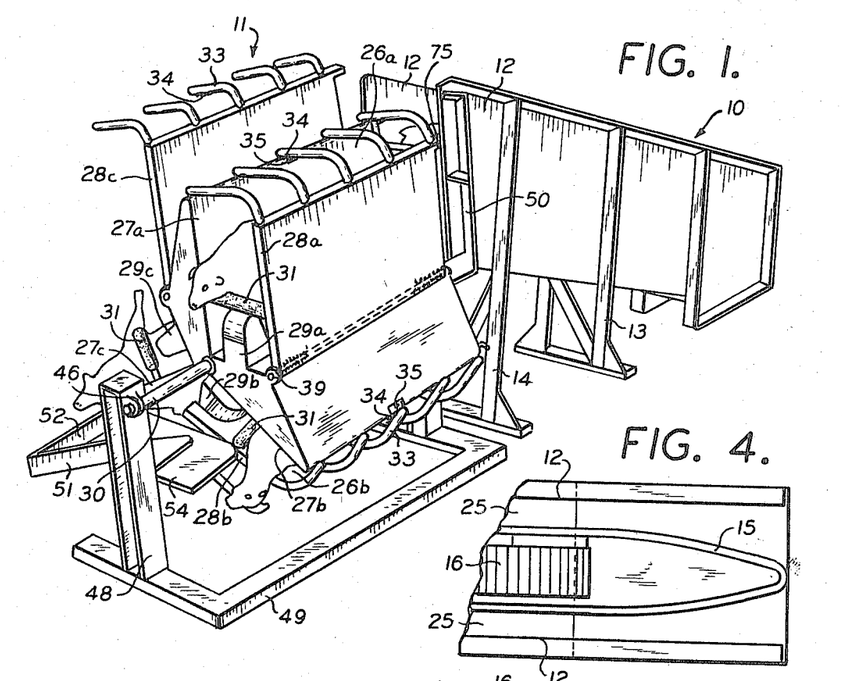
FIG. 1 is a perspective view of the holding pen wheel assembly and its cooperating access and feeding chute, in this instance including a conveyor, according to one embodiment of my invention.
FIG. 4 is a partial plan view of the rearward portion of the access chute and conveyor for feeding the animals into the holding pen, as incorporated in the foregoing embodiment.
Figure 5:
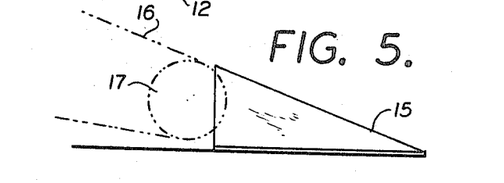
FIG. 5 is a diagrammatic side view of the rearward portion of the conveyor section of the foregoing form of chute.

According to this embodiment of the invention, there is provided at the entrance to the chute, which is at the rear or bottom end thereof, a hoof spreader 15, FIGS. 4 and 5, and comprising, in this instance, a generally V-shaped member having a smoothly-rounded end, and having sides which extend from a point near the entrance to the chute at ground level and which gradually increase in height as they extend forward and upward in the chute. The maximum height of the sides of the hoof spreader 15 should always be less than the minimum height of the animal's belly. The hoof spreader 15 forces the animal to walk into the chute with its legs spread sufficiently for the conveyor belt 16 to engage the belly of the animal. The conveyor belt 16 extends from roller 17 (FIG. 5) disposed near ground level at the rear of the chute but somewhat beyond the beginning of the hoof spreader 15, preferably at about the point where that has attained its maximum width (FIG. 4), over roller 18 at the forward (upper or exit) end of the chute 10, to the rear of idler 19 and over reductor 20 which is driven by a suitable motor 21, mounted upon an adjustable motor base 22, which is in turn mounted upon a drive platform 23 supported by the structural frame members 13 and 14.

The floor 24 of the chute 10 on either side of the conveyor belt may suitably be formed preferably from sheet metal. Metal sheaths (not shown) may be provided to extend from the floor on each side to a point just below the conveyor belt 16, thus forming, with the side walls 12 of the chute, channels 25 for the animal's legs. The channels 25 thus formed should always be sufficiently deep so that the animal's hooves will not touch the floor while the animal is being transported on the conveyor, at which time the animal is supported on its belly while it is on the conveyor.

The holding pen wheel assembly generally designated as 11 is comprised of three substantially indentical compartments 26a, b and c, each designed to receive a single animal, and each having sides consisting of a stationary panel 27a, b and c and a movable restraining panel 28a, b and c, each panel preferably being formed of stainless steel and filled with foam rubber or other suitable cushioning material. At the bottom of each compartment 26a, b and c is a belly support 29a, b and c, slightly narrower than the width of the animal's belly and extending sufficiently high to support the belly of the animal so that its feet do not come in contact with the floor of the compartment.

The top of the belly support 29a, b and c may be formed of stainless steel or other smooth-surfaced material, or, alternatively, may be provided with a free-wheeling belt conveyor. In either event, the holding pen wheel assembly 11 which is mounted to rotate on the shaft 30 is inclined sufficiently so that the weight of the animal will help to carry it forward upon the belly support 29a, b and c, until the chest of the animal comes to rest against bump pads 31 which are covered with plastic or rubber and filled with foam rubber or other suitable cushioning material, and mounted upon steel tubing 32 affixed to the walls of the belly support 29a, b and c.

The top of each compartment is partially enclosed by tubes 33, preferably of stainless steel extending from the top surface of each restraining panel 28a, b and c. The restraining panels 28 are maintained in closed position by ratchets 34 mounted on one of the tubes 33 of each restraining panel 28 engaging with pawls 35 mounted on the stationary panels 27a, b and c.

The ends of each restraining panel 28 are formed with flanges 36, in which are drilled holes 37 (FIG. 7) cooperating with holes 38 in support bars 39 projecting from the holding pen wheel assembly 11 (FIG. 1). A bar 40, preferably in the form of steel tubing, threaded at each end to receive bolts 41, extends between the flanges 36.

A compression spring 42 at each end of the bar, having its ends 43 and 44 projecting against the inner edges 45 of the support bars and the inner faces of the restraining panels 28, tends to urge the restraining panels to the open position when the ratchet 34 is released, so that the restraining panel 28 is out of the way of the operator and the hoisting apparatus when the slaughtered animal is removed.

The holding pen wheel assembly 11 is mounted on the shaft 30, the ends of which are rotatably journalled in brackets 46 attached to frame members 47 and 48. The frame members 47 and 48 are mounted on the bed plate 49 to project forward at an angle of approximately 10° from the vertical. Secured to the rear frame member 47, at an angle of approximately 30° from the horizontal, is a beam 50 extending on the higher side to a point approximately in line with the lower left-hand corner of the compartment 26 which is in the "a" (first or loading) position, and extending upwardly from that point in a line which is parallel to the rear face of the holding pen wheel assembly 11 and to the left-hand side of the chute 10.

On the lower side, the beam 50 extends downwardly, and parallel to the inner face of the stationary panel 27 of the compartment which is in the "c" (third or unloading) position. A second beam 51 secured to the forward frame member 48 extends downwardly therefrom and parallel to the first beam 50. A cross bar 52 connects the two beams 50 and 51 at their lower ends. Projecting upwardly from the cross bar 52 are steel tubes 53, so spaced as to interlace with and lie between the steel tubes 33 forming the roof of the compartment 26a, b and c thus forming a support for the back of the slaughtered animal when the restraining panel 28a, b and c is opened.

If desired, a spatter plate 54 may be mounted on the forward frame member 48, so that the spurt of blood from the slaughtered animal will strike it, and fall to the ground in the vicinity of the slaughtering operation. A drain, not shown, may be provided for the blood, which is usually collected and forms a valuble by-product of the slaughtering operation.

Between the leading chute 10 and the first or loading position of the holding pen wheel assembly 11, there is preferably, although not necessarily arranged a gate 55 for controlling the access of the animals to the loading compartment. This gate may be operated, either manually or preferably automatically, in the manner above and hereafter in greater detail described. The operation of the mechanism is such that, as the animals are successively presented head on by the conveyor in the chute, an animal can not enter the loading compartment until the latter has come to rest and its restraining side has been opened. One animal at a time is then permitted to enter the loading chamber (position 1) where it is duly restrained before rotation of the wheel. The forward movement of the conveyor in the loading chute is coordinated with the opening and closing of the gate so that only one animal at a time can be introduced into the compartment and that is done only at the time when the compartment at the loading position is in appropriate condition to receive the animal (empty, stationary, opened) and so that other animals from the rear are not forced forward against the gate, but are carried forward only when the gate 55 has been opened and the compartment is ready to receive them.

Figure 2:
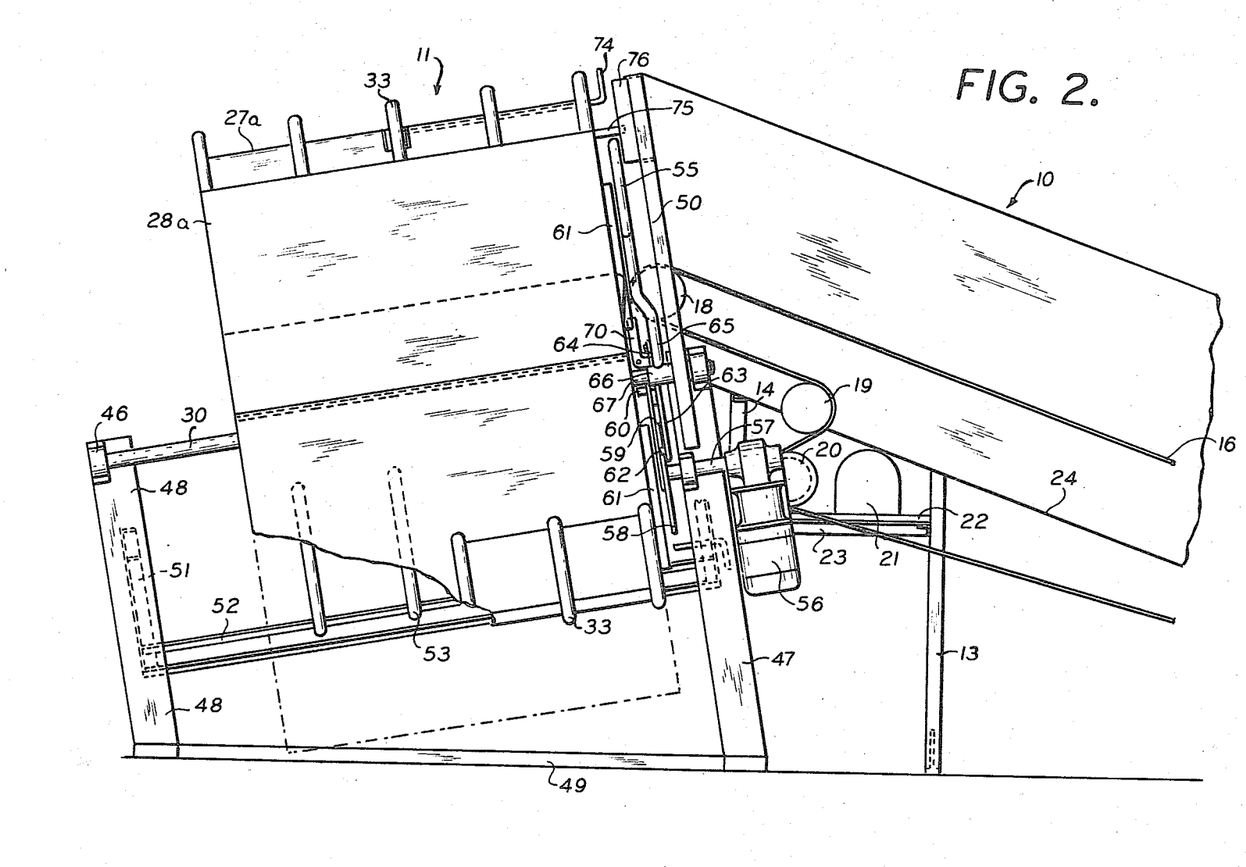
FIG. 2 is a partial side view, partially in section, of the holding pen wheel assembly and forward end of the chute, according to the foregoing embodiment.
Figures 3, 8:
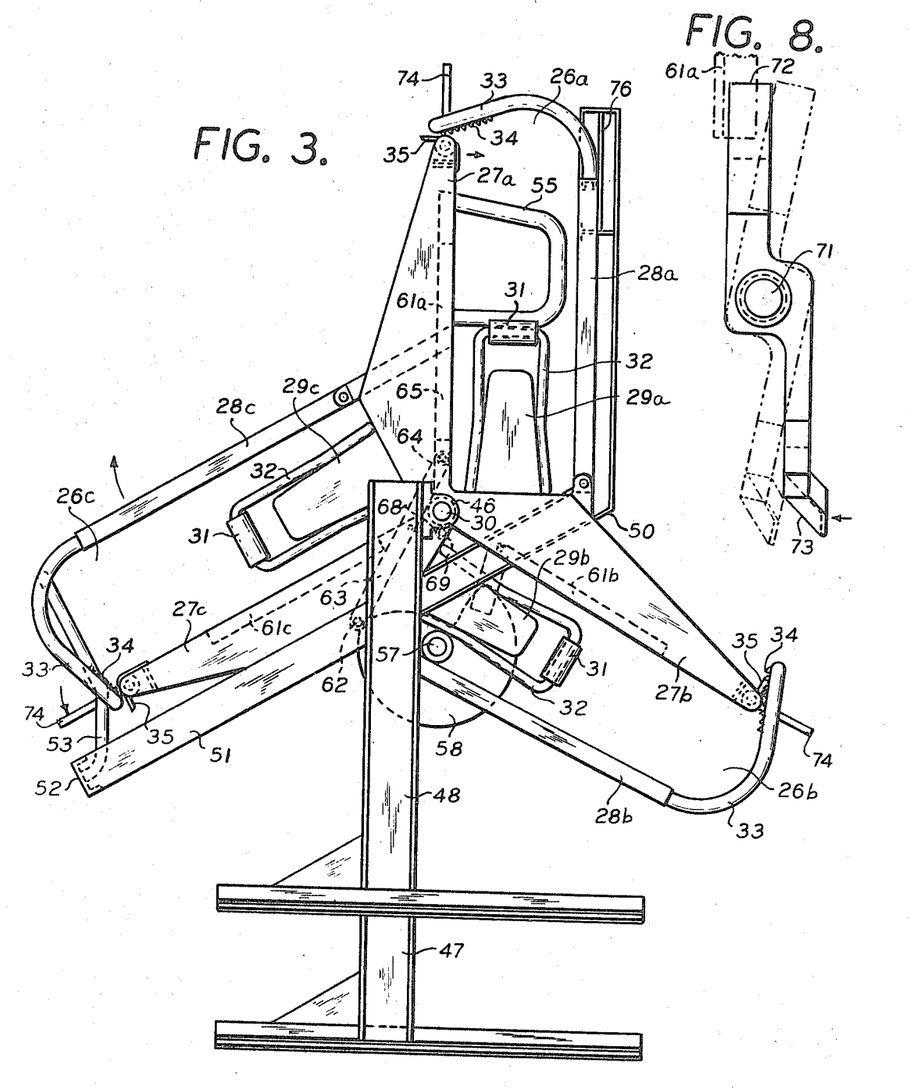
FIG. 3 is a front end view of the holding pen wheel assembly according to the foregoing embodiment.
FIG. 8 is a detail side view of the wheel lock for the foregoing embodiment of the holding pen.
Figures 6, 7:
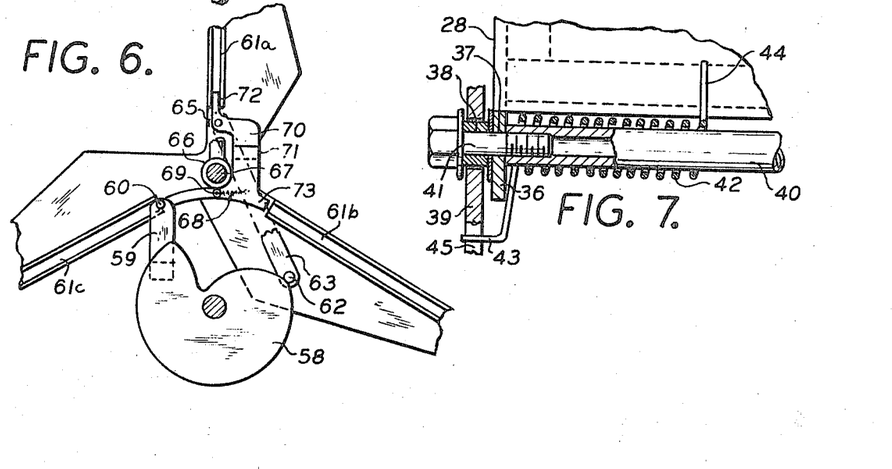
FIG. 6 is a detail view of part of the gate mechanism at the rear of the holding pen wheel assembly as used in the foregoing embodiment.
FIG. 7 is a detail view, partly in section, of a device for operating the restraining panels of the compartments of the holding pen wheel assembly of the foregoing embodiment.

It is also convenient to locate in the same vicinity the principal components of the drive and control mechanism for the holding pen wheel assembly 11, one possible form of which is illustrated in FIGS. 2, 3 and 6, including the clutch, brake and drive assembly 56 and the drive shaft 57, upon which is mounted the gate cam 58. Affixed to the gate cam 58 is a drive arm 59 bearing a roller 60 which engages slots 61, formed at the rear edges of the stationary panels 27a, b and c of the holding pen wheel assembly 11. The cam follower 62 is mounted upon a lever 63 extending from a stud 64 projecting from the gate post 65, and welded to the sleeve 66 in which the gate post 65 terminates, the sleeve 66 being rotatably mounted on a shaft 67. A tension spring 68 may be affixed to the lever 63 at one end and to a hook 69, projecting from the sleeve 66 downward, urging the cam follower 62 against the cam 58. When the cam follower 62 is at the shortest radius of the gate cam 58, the gate opens. When the cam follower 62 is at the longer radius of the gate cam 58, the upward thrust on the lever 63 maintains the gate 55 in closed position. As will be explained hereinafter, means are provided to prevent the mechanism from operating when the gate 55 is open.

The three positions or stations of the wheel assembly are shown in FIG. 3. The compartment 26a, when in upright position, is the one in which the animal is received from the chute 10. It is, when in that position, the compartment into which an animal is to be loaded, hence, the compartment designated as being in loading position—sometimes above briefly referred to as the loading compartment. Compartment 26b in FIG. 3 is in the position at which the animal is slaughtered, and compartment 26c is in the position from which the animal is removed.

These three positions will be referred to hereinafter, for convenience, as the "first," "second" and "third," or more simply, merely as the "a," "b" and "c" positions, respectively. It will be understood that each compartment is moved successively into the first or "a" position, the second or "b" position and the third or "c" position, and thus serves successively as the loading and restraining compartment, the slaughtering compartment, and the unloading compartment, after which it returns empty to the first position and is again ready for loading.

In operation, as the gate cam 58 rotates clockwise, as shown in FIG. 3 (counter-clockwise in FIG. 4), the roller 60 at the end of the drive arm 59 engages the slot 61b. The holding pen wheel assembly 11 is moved one-third of a revolution, so that compartment 26a, into which a live animal has been loaded while in position "a," is moved to position "b," in which position the animal, supported and cradled between the stationary panel 27a, and the restraining panel 28a with its throat exposed, is slaughtered. The schochet severs, inter alia, the carotid arteries of the animal, with a single stroke of a sharp knife. After this operation has been performed, the roller 60 at the end of the drive arm 59 as it rotates will leave slot 61b (now in the "c" position) and engage slot 61a and as it continues to rotate will cause compartment 26a to be moved to position "c." Operation of the lever 74 disengages the pawl 35 from the ratchet 34, thus allowing the clamping panel 28a to spring open to the position shown in FIG. 1. The animal, which has by that time lost consciousness, is shackled by its hind leg or legs to a chain and hoisted away.

Upon the last rotation of the holding pen wheel assembly 11, compartment 26a is moved again to position "a," ready to receive another animal. The restraining panel 28a remains open until, upon further rotation of holding pen wheel assembly 11, the flange 75 in the rearward end of the restraining panel 28a, b and c engages a steel spring 76, thus retaining the restraining panel 28a in an upright position until the stationary panel 27a has reached a vertical position and the pawl 35 engages ratchet 34. After an animal has been received into the compartment, the gate 55 is closed, and the holding pen wheel assembly 11 has started to turn, the flange 75 bearing against the spring 76 will retain the restraining panel 28a, and will restrain the top edge of the restraining panel from movement, as the top edge of the stationary panel 27a advances, until a certain predetermined pressure, carefully calculated so as to cause no pain or injury to the animal, has been reached, at which point the spring 76 gives way and the restraining panel, locked to the stationary panel by ratchet 34 forms with the stationary panel a unitary compartment and moves therewith. As a result, the animal, when inverted, is gently cradled first on its side and then on its back, so that it does not slide backward and strike the tubes 33, and so that its feet are relatively confined in the spaces between the belly support members 29a and the stationary and restraining panels 27a and 28a which form the interior walls of the compartment. The animal is thus disabled from thrashing about and possibly causing injury to itself prior to slaughter.

A wheel lock 70 is pivotally mounted on a shaft 71 on frame member 47, so positioned that when the upper portion 72 of the wheel lock 70 is in a forward position, it engages with slot 61a formed in the stationary panel 27a of the holding pen wheel assembly 11. This locked position is achieved when the roller 60 on drive arm 59 leaves the slot 61b after one revolution of the gate cam 58, thus bearing against, and forcing to the rear, the lower or arcuate portion 73 of the wheel lock 70.

Figure 9:
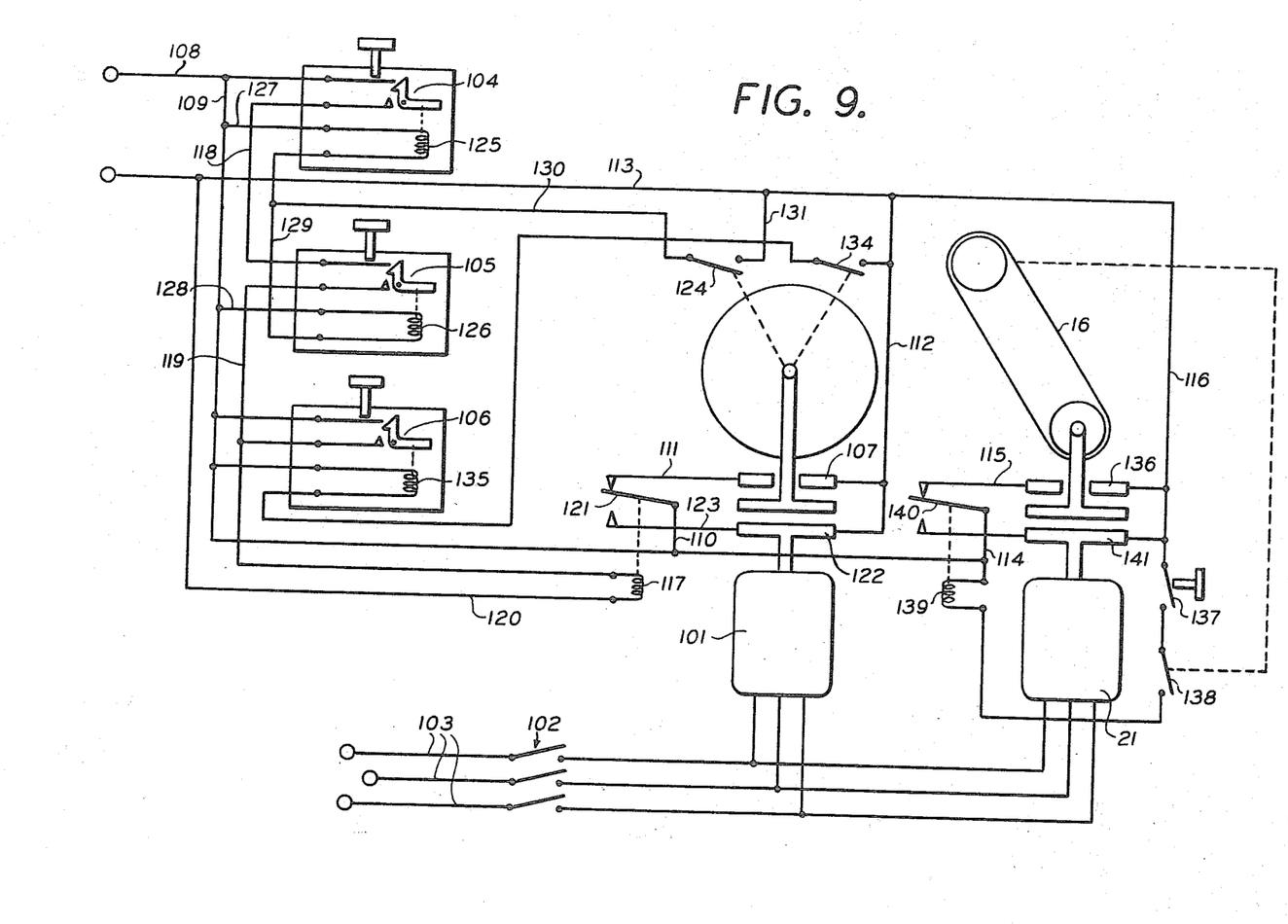
FIG. 9 is a circuit diagram of some of the principal elements of one form of electrical circuit suitable for operating the holding pen wheel assembly and chute, conveyor and gate mechanisms to insure their correct conjoint operation in accord with the correct timing sequence.

An appropriate form of electrical circuit for use in operating the foregoing embodiment of my invention is illustrated diagrammatically in FIG. 9, although it will be obvious that other appropriate circuits might be used. The conveyor motor 21 and the wheel assembly motor 101, which may be of the 3-phase type, are connected through contacts 102, in lines 103, with a suitable source of 3-phase voltage, indicated at the lower left of the diagram. The control circuit shown in the upper portion of FIG. 9 may be operated from a 90-volt direct current supply. When switches 104, 105 and 106 are in the open position, it will be seen that the brake 107 for the wheel assembly is energized through lines 108, 109, 110, 111, 112 and 113, and similarly that the brake 136 for the conveyor is energized through lines 108, 109, 114, 115 and 116. When the schochet has finished with the slaughtering operation, he presses a button which may be conveniently located on the forward frame member 48 of the wheel assembly. Then switch 104 is locked into poposite side from the schochet. It should be noted that the schochet's assistant, who shackles and hoists the slaughtered animal, indicates his readiness by operating a second switch 105, which may be conveniently placed on one of the frame members of the wheel assembly on the opposite side from the Schochet. It should be noted that the schochet's assistant will normally be in a position to observe when a live animal has been received into the upright compartment and the gate is closed. When both switches, 104 and 105, are locked into position, the solenoid 117 is energized through lines 108, 118, 119 and 120, thus operating the switch 121, so that the clutch 122 for the wheel assembly is energized through lines 108, 109, 110, 123, 112 and 113. The wheel assembly will turn one-third of a revolution, as previously described, and until the roller 60 of the drive arm 59 leaves channel 61b, which will then be in the position of channel 61c, as shown in FIG. 3. At that point a switch 124, normally open, is tripped, by any convenient means, thus energizing solenoids 125 and 126 through lines 108, 109, 127, 128, 129, 130, 131 and 113, thereby releasing switches 104 and 105. At the same point, the cam follower 62 falls into the slot or shorter radius of the cam 58, and the gate 55 is opened, as previously described. The solenoid 117 is de-energized, the switch 121 returned to its original position as shown in FIG. 9, and the brake 107 energized, thus stopping the rotation of the drive shaft 57. When the schochet and his assistant have operated switches 104 and 105 respectively, the rotation of the wheel continues, as previously described, until the roller 60 on drive arm 59 reaches the entrance to the slot 61a, at which time the wheel lock 70 is released.

Alternatively, the wheel assembly may be operated by one person, who might be stationed anywhere around the holding pen, for example, at or near the gate 55, and preferably on a platform from which he is able to observe the animals in the chute 10 and compartment 26a. In that event, the operator, by closing switch 106, energizes solenoid 117 through lines 108, 109, 132, 133 and 119, thus operating switch 121 and energizing the clutch 122, as previously described. The wheel assembly will turn one-third of a revolution, as previously described, and until the roller 60 of the drive arm 59 reaches a predetermined point, after which time the switch 134 is closed, thus energizing solenoid 135, de-energizing solenoid 117 and energizing the brake 107, as previously described.

It will be apparent that the circuit may be so arranged that the switches 124 and 134 are closed at the same time, for example, when the follower arm 59 reaches one of the channels 61 so that the mechanism will stop at that point, until the schochet and his assistant have operated switches 104 and 105, so that the gate 55 begins to turn until the roller 60 of drive arm 59 enters the opposite channel 61, at which time the gate should be closed. Still another switch or switches may be provided if desired, so that, if the gate is not closed at that point, switches 104 and 105 are opened again, and the mechanism stops until the gate 55 has been closed. In that event, simultaneous signals from three points, the switches 104 and 105 and the third switch operated by closing of the gate, are required before the mechanism can be rotated to its next position.

Ideally, a third person is stationed on a platform from which the entire operation may be observed and operates the third switch only when the compartment in position "a" has been loaded and the gate closed. In the interest of economy of operation, however, such a third person may be dispensed with and the signal for rotation be given automatically by closing of the gate; or the schochet's assistant may be depended upon to observe the loading and not to press his button until loading has been properly accomplished.

Brake 136 of the conveyor 16 is normally energized through lines 108, 109, 114, 115 and 116 when either of switches 137 or 138 is open. When both switches are closed, solenoid 139 is energized, thus operating switch 140, and energizing the clutch 141, and causing the conveyor to move. Switch 137 may be conveniently operated by the same person who operates switch 106, as previously described, or as mentioned just above, by an assistant stationed at the rear of the device in a position to observe the position of the animals on the conveyor belt 16. Switch 138 may be operated by any suitable device which senses the presence of an animal in the forward section of the chute 10 near the gate 55.

Figures 10, 12:
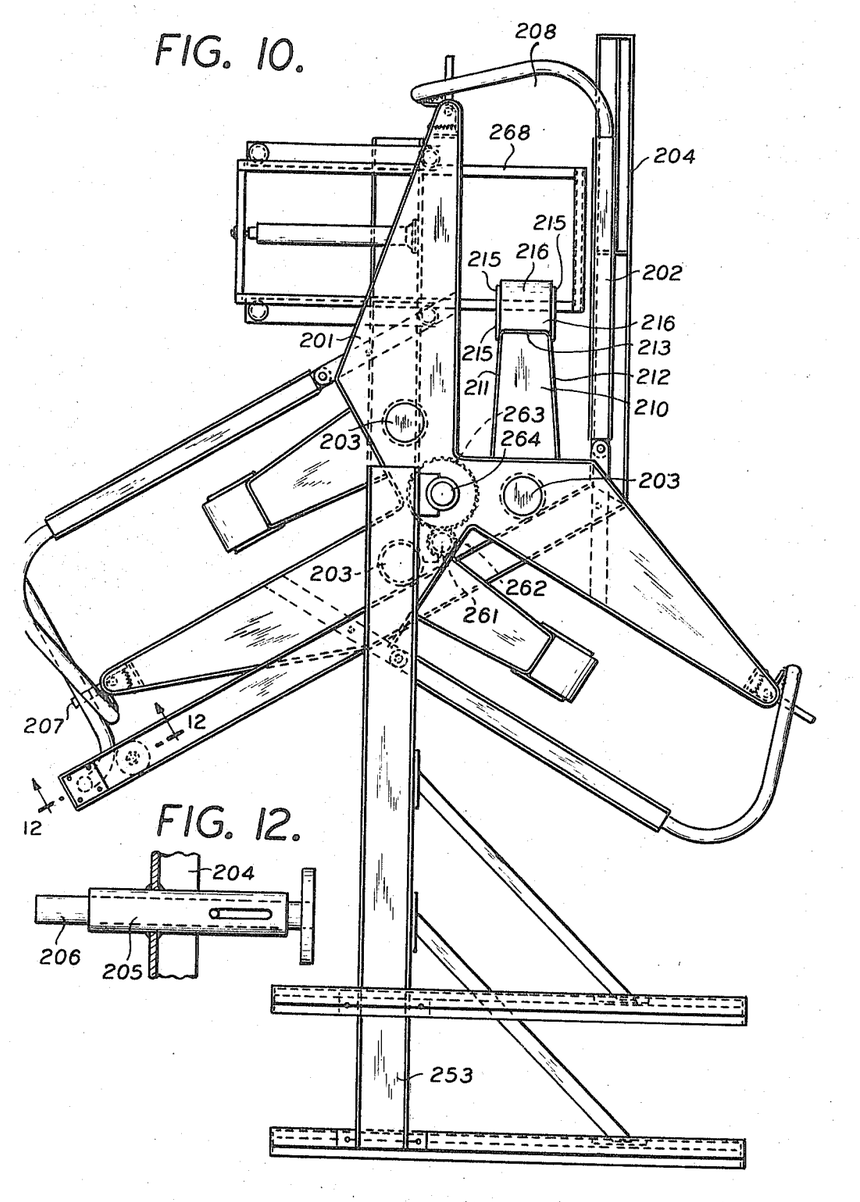
FIG. 10 is a front end view of an alternative embodiment of the holding pen wheel assembly according to our invention, comprising, as before, an assembly of three animal compartments.
FIG. 12 is a detail sectional view on the line 12—12 of FIG. 10, of a portion of the frame of the holding pen wheel assembly of FIG. 10, showing a means for automatically releasing the side panels of the several animal compartments of the holding pen wheel assembly.
Figure 11:
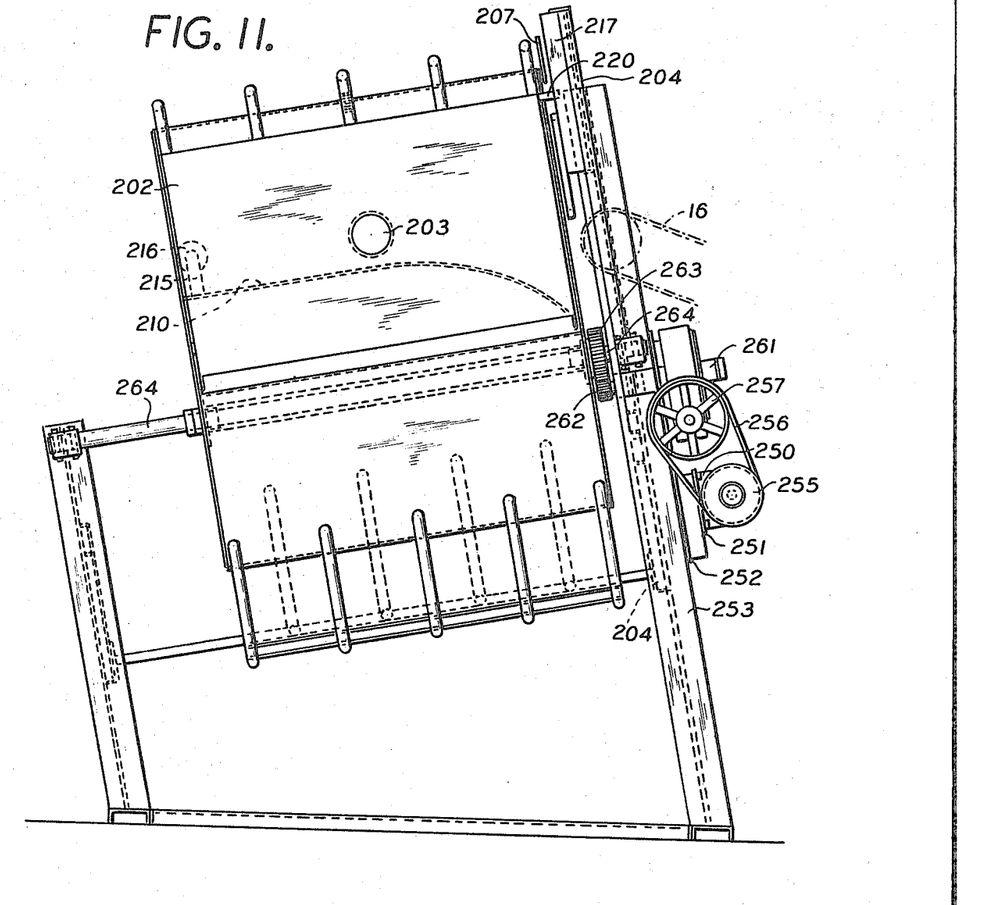
FIG. 11 is a side view of the holding pen wheel assembly, showing parts of two compartments.
Figure 22:
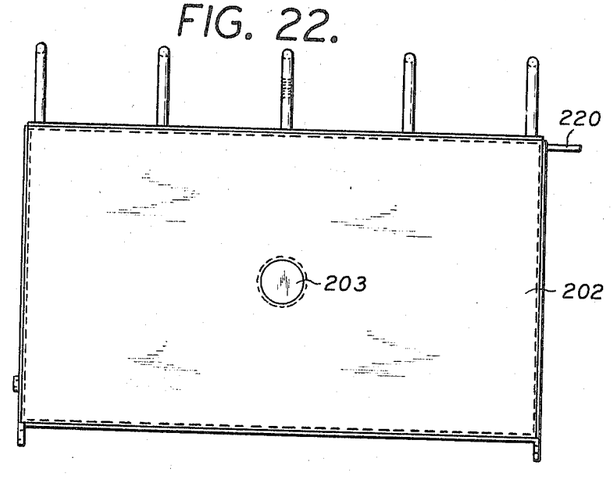
FIG. 22 is a side view of one of the restraining panels of the animal compartments forming part of the holding pen wheel assembly of FIG. 10.
Figure 23:
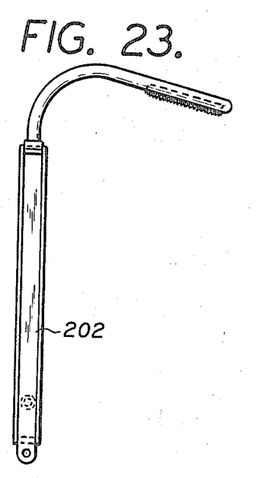
FIG. 23 is an end view of one of the restraining panels of one of the animal compartments of the holding pen wheel assembly of FIG. 10.

An alternative form of holding pen wheel assembly suitable for some commercial applications of the invention is illustrated in FIGS. 10-24, inclusive. The holding pen wheel assembly, including the several animal compartments thereof, as illustrated in FIGS. 10 and 11, has essentially the same form as the holding pen wheel assembly 11 illustrated in FIGS. 1 through 9. The parts which are common to the two embodiments will not be redescribed. However, this alternative embodiment comprises certain additional features now to be described:

As shown in FIGS. 10, 11 and 22, in the holding pen wheel assembly 201 and in the restraining panels 202 suitable provision may be made for counterweights, as at 203.

As shown in FIG. 12, a means may be provided for the automatic release of the restraining panels 202 as each compartment 208 reaches the third or "c" position. This may be done by means of a simple projection from the rear frame member 204, or, as shown in FIG. 12, a tube 205 carrying a plunger 206 slidably mounted in the tube, so that the plunger 206 may be adjusted either for manual release by operation of the lever 207, or for automatic release by adjusting the plunger so that its end will be in the path of the lever 207 as it rotates toward position "c."

Figure 13:
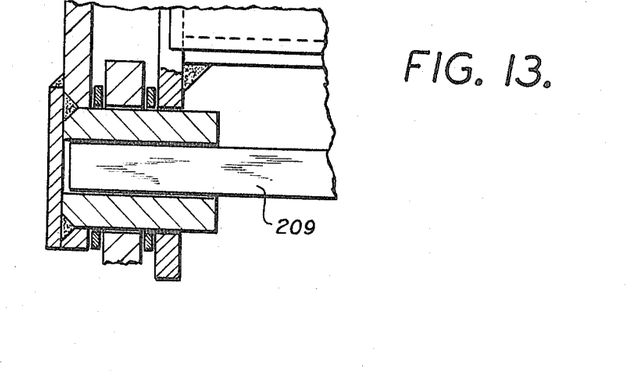
FIG. 13 is a detail sectional view of a corner of one of the restraining panels of one of the compartments of the holding pen wheel assembly of FIG. 10.

A third feature of the alternative embodiment is that, instead of the spring mechanism illustrated in FIG. 7, the alternative embodiment is provided with a torsion bar 209 mounted as shown in detail in FIG. 13.

It will be apparent that the features just described are as readily adaptable to one embodiment as to the other.

Figure 14:
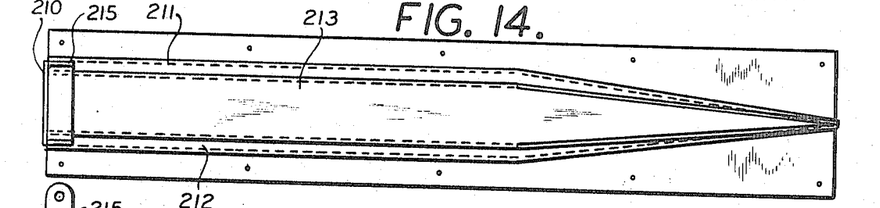
FIG. 14 is a plan view of a form of belly support as used in each animal compartment of the holding pen wheel assembly of FIG. 10.
Figure 15:
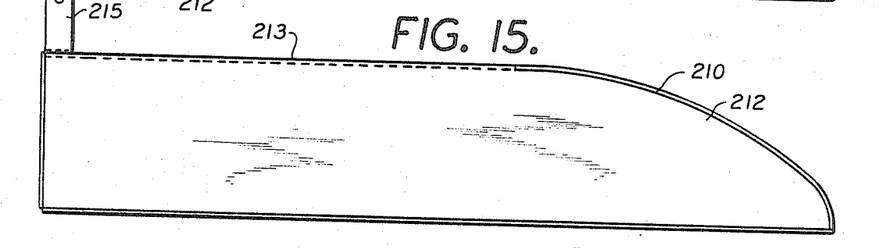
FIG. 15 is a side view of the belly support of FIG. 14.
Figures 16, 17:
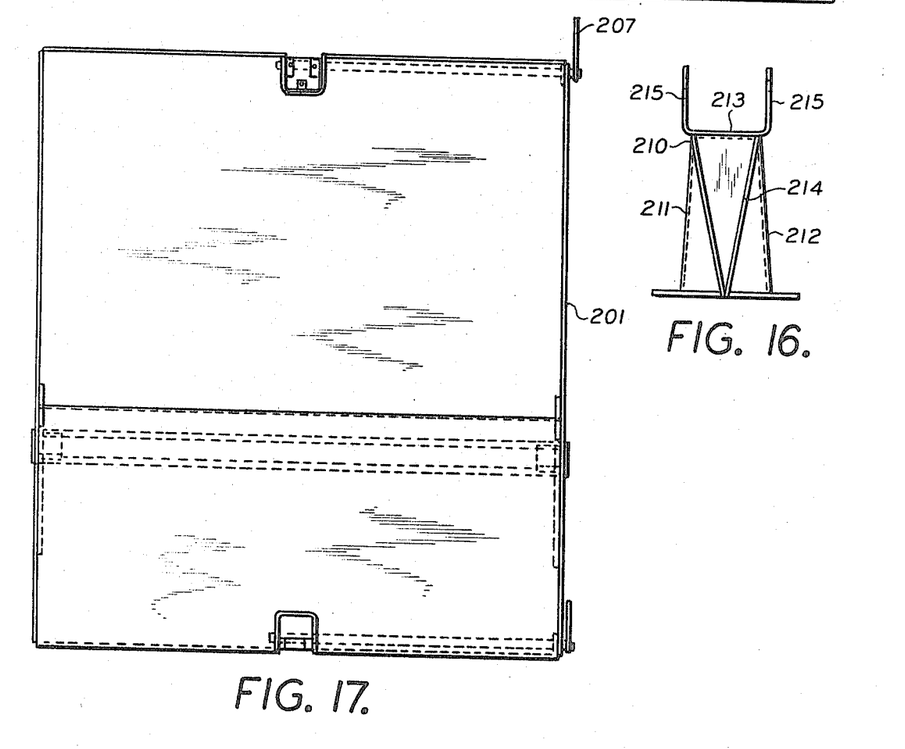
FIG. 16 is a front end view of the belly support of FIG. 14.
FIG. 17 is a detail side view of part of the holding pen wheel assembly of FIG. 10.

A further alternative arrangement is the belly support provided in each animal compartment of the holding pen wheel assembly ilustrated in FIGS. 14, 15 and 16, this form of belly support being designated 210. This belly support consists of side panels 211 and 212 and top panel 213, all formed of smooth sheet metal with no bolts or sharp projections which would injure the animal, and a suitable supporting frame member 214. At the rear, the belly support may be sloped or curved smoothly to floor level, as shown in FIG. 15, and the sides may be gradually narrowed to a point at the rear, as shown in FIG. 14. Belly support 210 is formed with flanges 215 for mounting the bump pad 216.

Figures 18, 20:
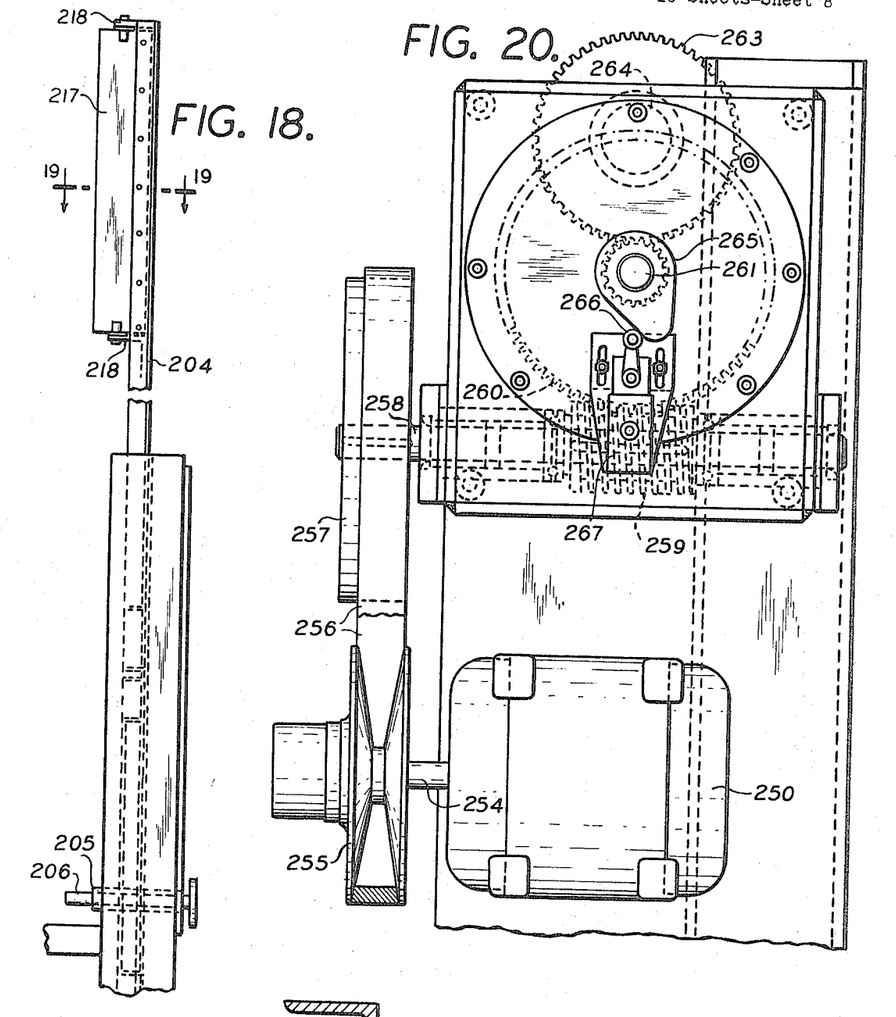
FIG. 18 is a detail view of one of the frame members forming part of the holding pen wheel assembly of FIG. 10, showing the clamp and release device for the restraining panels of one of the compartments of the holding pen wheel assembly.
FIG. 20 is a detail end view, partly in section, of the driving mechanism of the holding pen wheel assembly of FIG. 10.
Figure 19:
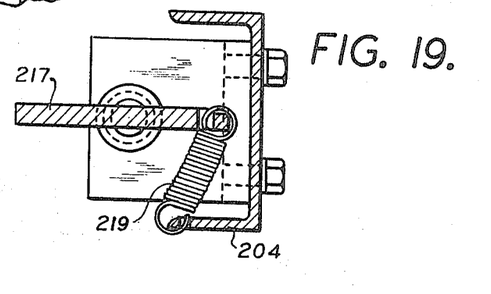
FIG. 19 is a detail section on the line 19—19 of FIG. 18.

An alternative form of clamp and release mechanism for the restraining panels of the several animal compartments of the holding pen is illustrated in FIGS. 18 and 19. It comprises a rectangular plate 217 mounted to pivot at its end on brackets 218 projecting from a rear frame member 204. A tension spring 219 extending from the edge of the frame member 204 to the rear edge of the plate, restrains the plate from moving until a certain predetermined pressure sufficient to hold the animal in place, but insufficient to cause substantial pain or injury, is reached, at which time the plate pivots from the force exerted by the flange 220 projecting from the restraining panel, and releases the same.

Figure 21:
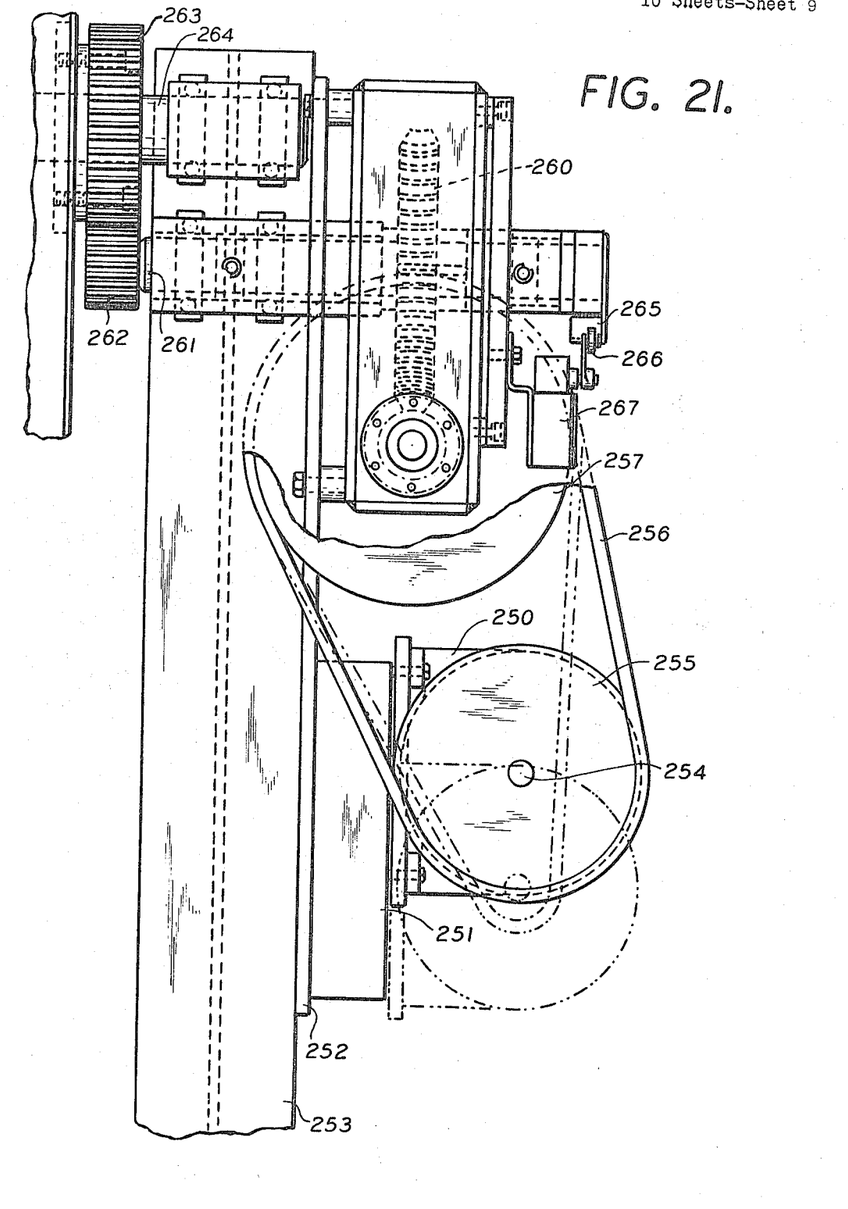
FIG. 21 is a longitudinal sectional view of the driving mechanism of FIG. 20.

A principal difference in the alternative embodiment of FIGS. 10-24 from the embodiment previously described is the drive and control mechanism illustrated in detail in FIGS. 20 and 21. Instead of the Geneva mechanism of the first embodiment, the alternative embodiment is driven by a suitable motor 250 which may be a 2-horsepower motor, mounted on an adjustable base 251, which is in turn mounted on a suitable mounting plate 252, affixed to a rear frame member 253 of the holding pen. Mounted on the output shaft 254 of the motor 250 is a variable speed motor pulley 255, carrying a suitable belt 256 which drives the wheel 257 mounted on the input shaft 258 of a 40 to 1 worm gear reducer.

The worm 259 is a 4-pitch single thread worm, and worm wheel 260 is a 4-pitch 40 tooth worm wheel. The output shaft 261 of the worm wheel 260 carries, at one end, a 4-pitch 10 tooth pinion gear 262, which meshes with a 4-pitch 30 tooth spur gear 263 mounted on and driving the main shaft 264 of the wheel assembly 201. At the other end of the output shaft 261 of the worm gear is a cam 265, which, at the end of every revolution of the output shaft 261, strikes a lever 266 which closes a wheel rotation control limit switch 267, thus stopping the motor 250, as will be described hereafter. Thus, for every revolution of the output shaft 261, the main shaft 264 and the wheel assembly move one-third of a revolution, thereby moving each compartment 208 to the next position. Also, suitable braking means not shown, are provided in the armature of the motor.

A suitable gate 268 may be provided as an alternative to the form of gate 55 as shown in FIG. 6, or the same form may be used if desired.

Figure 24:
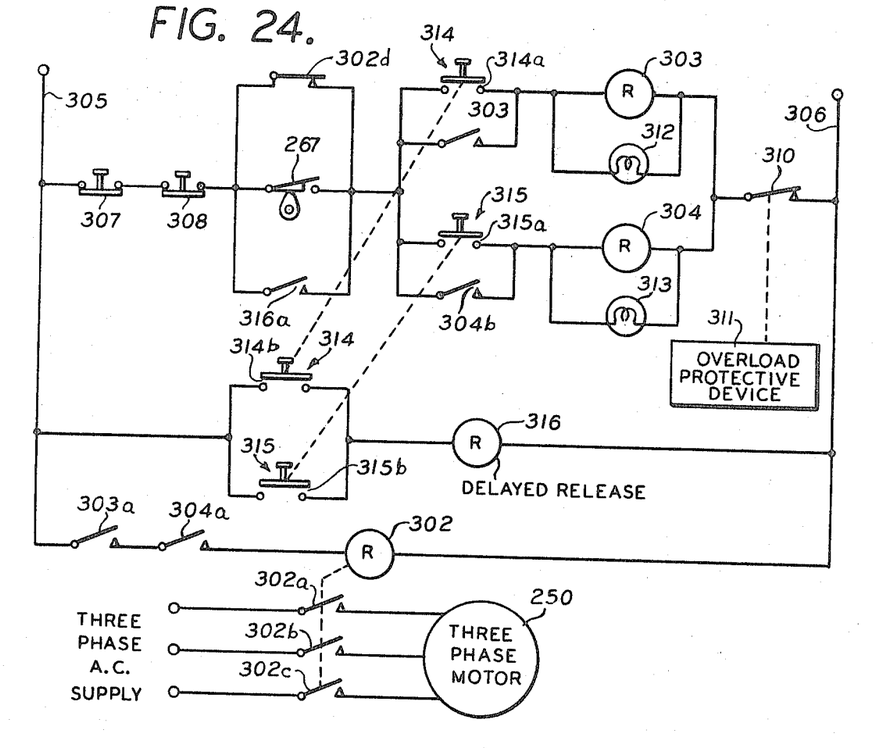
FIG. 24 is a circuit diagram of some of the principal elements of one form of an electrical circuit adapted for operating the holding pen wheel assembly of FIG. 10.

Reference should now be had to FIG. 24 which illustrates schematically the electrical circuit for controlling the drive motor 250.

The motor 250 may be of the 3-phase type connected to a suitable source of 3-phase voltage, as shown, through the normally open contacts 302a, 302b, and 302c of motor control relay 302. The electroresponsive operator of the control relay 302 is connected in series with normally open contacts 303a and 304a across the supply buses or lines 305 and 306. Lines 305 and 306 may be connected to a source of single phase 115 volts alternating current.

Contacts 303a are part of a relay 303. Similarly, contacts 304a are part of a relay 304. Relays 303 and 304 also include, respectively, contacts 303b and 304b. Line 305 is connected through normally closed stop switches 307 and 308 to the limit switch 267. The other side of the limit switch 267 is connected to both contacts 303b and 304b. The electroresponsive operator of relay 303 is connected between contacts 303b and normally closed contacts 310 of any known motor overload protection device 311 coupled to the motor 250 in known manner. The line 306 is connected to contact 310. Signal lamp 312 is connected in parallel with the electroresponsive operator of relay 303 while lamp 313 is connected in parallel with the electroresponsive operator of relay 304. Shunting contacts 303b is a first set of normally open contacts 314a forming a part of a start switch 314. Similarly, there is connected across contacts 304b a first pair of normally open contacts 315a which forms a part of the start switch 315. Start switch 314 also contains a second set of normally open contacts 314b which is connected in series with a delayed release relay 316 across the supply lines 305 and 306, as shown. Likewise, start switch 315 is provided with a second pair of normally open contacts 315b which is connected in parallel with the contacts 314b, as shown.

The motor control relay 302 is provided with a fourth set of contacts which is normally closed, designated by the reference character 302d. These contacts are connected in parallel with the limit switch 267. Also in parallel with the limit switch 267 is a set of normally open contacts 316a which is controlled by the delayed release relay 316.

The operation of the circuit will now be described:

With the holding pen wheel assembly in its normal rest position, the various switches will be in the condition shown in FIG. 24. Signal lamps 312 and 313 will be extinguished and motor 250 will be inoperative. Assume, for example, that start switch 314 is actuated by the schochet. This will momentarily close contacts 314a and 314b. Upon closure of contacts 314a, a circuit will be completed from line 305 through switch 307, switch 308, closed contacts 302d, closed contacts 314a, the operator of relay 303, closed contacts 310 to line 306. Relay 303 will be energized, closing its contacts 303a and 303b. Closure of contacts 303b completes a holding circuit for relay 303 around contacts 314a. The momentary closure of contacts 314b will energize the relay 316. Relay 316 is of a known type which picks up instantaneously and releases after a predetermined time delay. Hence, contacts 316a will close to provide, during a short interval, an additional by-pass around limit switch 267 which is presently open. At this point it is immaterial whether relay 316 remains in its operative condition or resumes its released state prior to operation of the second start switch 315. However, when the second start switch 315 is operated by the schochet's assistant, it will cause energization of the relay 304 in a manner similar to that previously described for relay 303. This will cause contacts 304a and 304b to close. Contacts 304b provide a holding circuit for relay 304.

Upon closure of both contacts 303a and 304a, a circuit is completed for energizing the motor control relay 302. This causes closure of contacts 302a, 302b, 302c, and opening of contacts 302d. Motor 250 will be energized and will commence driving the mechanism. This results in closure of limit switch 267. It will be appreciated, however, that contacts 302d will open at a short time interval prior to closure of limit switch 267. In order that this does not cause relays 303 and 304 to be de-energized, contacts 316a are maintained closed for a limited time by relay 316 which has been given a second energizing impulse by reason of momentary closure of contacts 315b. By the time relay 316 becomes de-energized and opens its contacts 316a, the motor 250 will have driven the device far enough to close limit switch 267. The device will continue to operate until it completes one cycle, whereby limit switch 267 is reopened. When this occurs, the circuit through relays 303 and 304 will be interrupted and they will become de-energized. Contacts 303a and 304a will now open, causing de-energization of relay 302 and opening of the supply circuit to motor 250. At the same time, contacts 302d will re-close, preparing the circuit for a new cycle.

The system can be stopped at any time by opening of either one of the two stop switches 307 and 308 so as to de-energize the relays 303 and 304. The same result can be achieved by opening of contacts 310 in the event of an overload on motor 250.

Either embodiment of the holding pen wheel assembly herein described may be used in combination and coordination with the chute and conveyor illustrated in FIGS. 1 and 2, or with other appropriate chute and conveyor means, or, if desired, without any chute or conveyor. The pen may, if desired, be loaded manually animals being introduced one at a time into whatever compartment is selected as the receiving compartment. This is preferably done, however, while the selected compartment is in an upright position and an appropriate entrance platform, ramp or other access means is provided for loading the animals into the receiving compartment.

By way of example, the access chute may be in the form of a ramp, enclosed at the sides, up which the animals walk to gate 55 or gate 268. Or, alternatively, the holding pen wheel assembly may be placed at a lower level, so that the level of the floor of the compartment in the "a" position is at the floor level from which the animals are fed into the device. In the latter instance, a narrow enclosure should be provided, so that the animals will be presented, one at a time and in line with the compartment which is in the "a" position.

Another alternative is that the position of each of the individual animal compartments may be reversed so that the movable side is pivoted at the circumference of the wheel and swings away from the fixed side at the inner periphery, near the axis of the holding pen wheel assembly. In that event, whichever compartment is in the "*a*" position is preferably at floor level for convenient loading, although a ramp may be provided. The position of the belly support 210 is reversed in this alternative. In case of such reversal, platforms are provided for the schochet and his assistant, arranged at a higher level where the slaughtering and removal operations take place.

Although my invention has been described above especially with reference to the Jewish ritual of shechita, or kosher slaughter, it will be understood that its usefulness is not limited to such slaughter, and that it may be used with equal advantage in non-kosher slaughter, and in conjunction with any of a number of humane methods for immobilizing or rendering animals unconscious prior to slaughter.

Although I have herein described and illustrated specific embodiments of my invention, I wish it to be understood that variations may be made therein without departing from the spirit of the invention or from the scope of the appended claim.

What I claim is:

In an apparatus for the humane slaughtering of small food animals, the combination of a rotatable holding pen wheel assembly comprising a plurality of animal compartments one of which is in loading position for receiving an upright animal while a second compartment is in an angularly displaced animal slaughtering position and a third compartment is in a further angularly displaced animal unloading position, said wheel assembly being supported to rotate in a substantially vertical plane about a substantially horizontal axis; at least one movable side for each of said animal receiving compartments; means for moving said side in an outward direction to permit loading of an animal while said compartment is in said loading position in which the animal may enter while substantially upright; means for introducing an animal into said compartment while it is in said loading position; means for closing the side of said compartment against the side of the animal to restrain the latter in a partially immobilized position and reduce the risk of injury by fright or struggling; means for rotating said wheel assembly to bring said loaded compartment into said slaughtering position in which said animal may conveniently be slaughtered by severance of the carotid artery and jugular vein, while the animal remains restrained in the compartment; and means for further rotating said wheel assembly to bring said compartment, now containing the slaughtered animal, into said unloading position from which the animal may conveniently be unloaded by loosening the movable side of the compartment, the several compartments of said wheel assembly being brought, successively, into said loading, slaughtering and unloading positions.

References Cited

UNITED STATES PATENTS

| | | | |
|---|---|---|---|
| 1,890,679 | 11/1934 | Graham | 17—1 |
| 2,681,040 | 6/1954 | Kniesteadt | 119—15 X |
| 2,979,762 | 4/1961 | Schultz | 17—1 |
| 3,081,483 | 3/1963 | Hughes | 17—1 |
| 3,087,195 | 4/1963 | Marshall et al. | 17—1 |
| 3,239,875 | 3/1966 | Hensgen et al. | 17—1 |

LUCIE H. LAUDENSLAGER, *Primary Examiner.*